(12) United States Patent
Atlason et al.

(10) Patent No.: US 9,728,315 B2
(45) Date of Patent: Aug. 8, 2017

(54) ELECTROMAGNETIC ACTUATOR HAVING ENHANCED MAGNETIC STRUCTURES

(71) Applicant: GOVERNORS AMERICA CORPORATION, Agawam, MA (US)

(72) Inventors: Arni Atlason, Feeding Hills, MA (US); Derek Custer, West Granby, CT (US); William Ferry, Southwick, MA (US)

(73) Assignee: GOVERNORS AMERICA CORPORATION, Agawam, MA (US)

( * ) Notice: Subject to any disclaimer, the term of this patent is extended or adjusted under 35 U.S.C. 154(b) by 562 days.

(21) Appl. No.: 14/193,559

(22) Filed: Feb. 28, 2014

(65) Prior Publication Data
US 2014/0246928 A1 Sep. 4, 2014

Related U.S. Application Data

(60) Provisional application No. 61/771,123, filed on Mar. 1, 2013.

(51) Int. Cl.
*H02K 33/00* (2006.01)
*H01F 7/14* (2006.01)
*H01F 7/17* (2006.01)

(52) U.S. Cl.
CPC ............... *H01F 7/14* (2013.01); *H01F 7/17* (2013.01); *H02K 33/00* (2013.01)

(58) Field of Classification Search
CPC ............. H01F 7/14; H01F 7/17; H02K 33/00
USPC .......................................... 310/29
See application file for complete search history.

(56) References Cited

U.S. PATENT DOCUMENTS

| | | | | |
|---|---|---|---|---|
| 2,702,841 A * | 2/1955 | Bernstein | ........... | H01H 51/2281 174/260 |
| 3,599,133 A * | 8/1971 | Richert | ................... | H01H 51/01 335/230 |
| 3,775,715 A * | 11/1973 | Bosch | ................ | H01H 51/2236 335/230 |
| 4,339,734 A * | 7/1982 | Minks | ................ | H01H 51/2236 335/78 |
| 4,498,065 A * | 2/1985 | Nagamoto | ......... | H01H 51/2236 335/230 |
| 5,574,416 A * | 11/1996 | Maruyama | ......... | H01H 51/2227 335/78 |
| 5,864,271 A * | 1/1999 | Mader | .................... | H01H 51/22 335/128 |
| 6,940,375 B2 * | 9/2005 | Sanada | ................ | H01H 50/642 335/129 |
| 2006/0238285 A1 * | 10/2006 | Dimig | .................... | F16D 27/025 335/270 |
| 2013/0043740 A1 * | 2/2013 | Xu | .................... | B60R 25/02153 310/12.04 |

* cited by examiner

*Primary Examiner* — Alex W Mok
(74) *Attorney, Agent, or Firm* — Grogan, Tuccillo & Vanderleeden, LLP

(57) ABSTRACT

An electromagnetic actuator includes a coil that is selectively energizable by an electric current. The electromagnetic actuator further includes an armature having a outwardly extending prong. The armature is movably disposed with respect to the coil such that when the coil is energized with the electric current, the armature moves in relation to the coil and disposing thereby the prong on a first side of the coil. A flux gatherer is provided to be disposed around a second side of the coil, thereby channeling magnetic flux emanating from the coil back into the armature and prong.

11 Claims, 4 Drawing Sheets

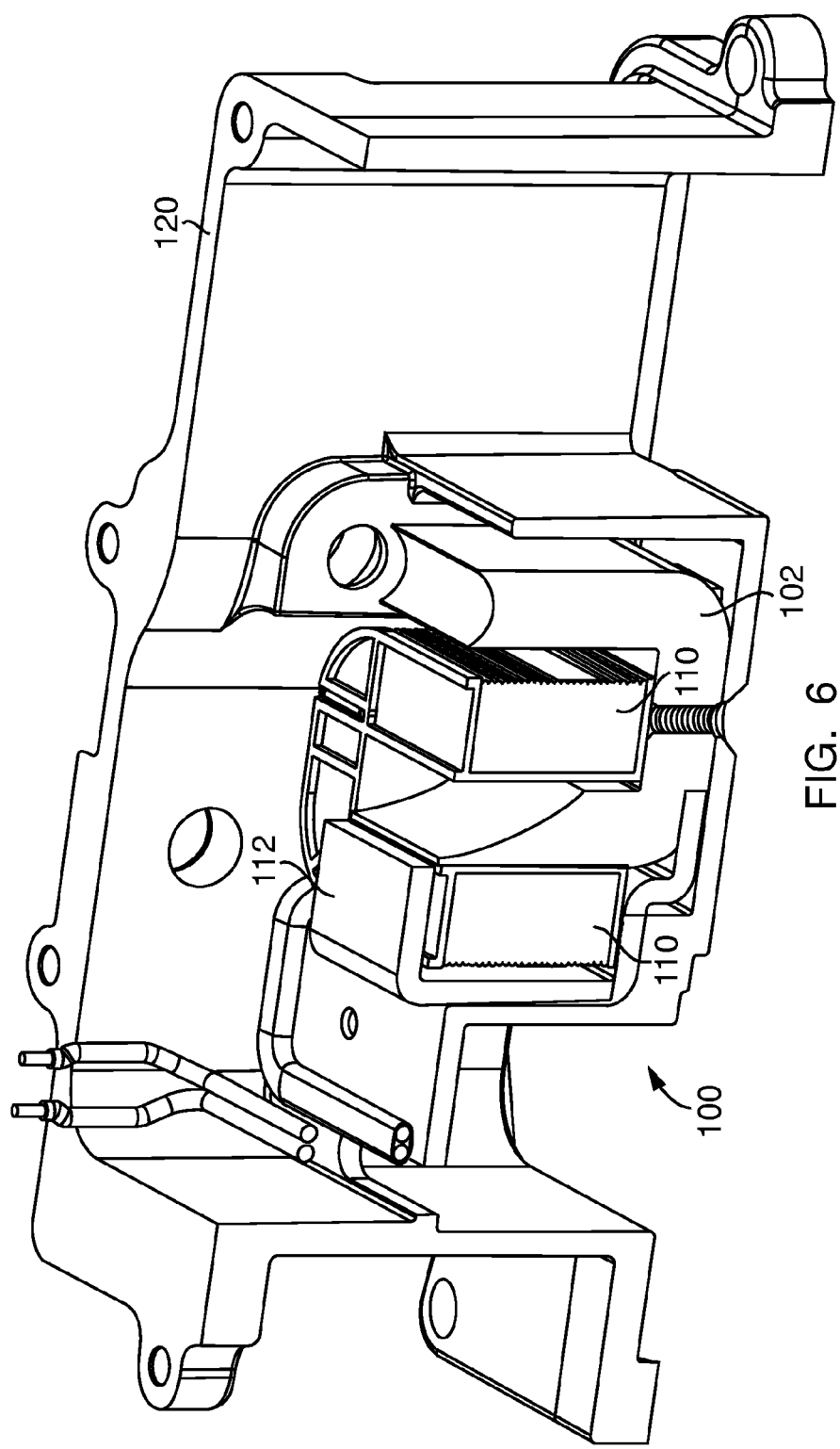

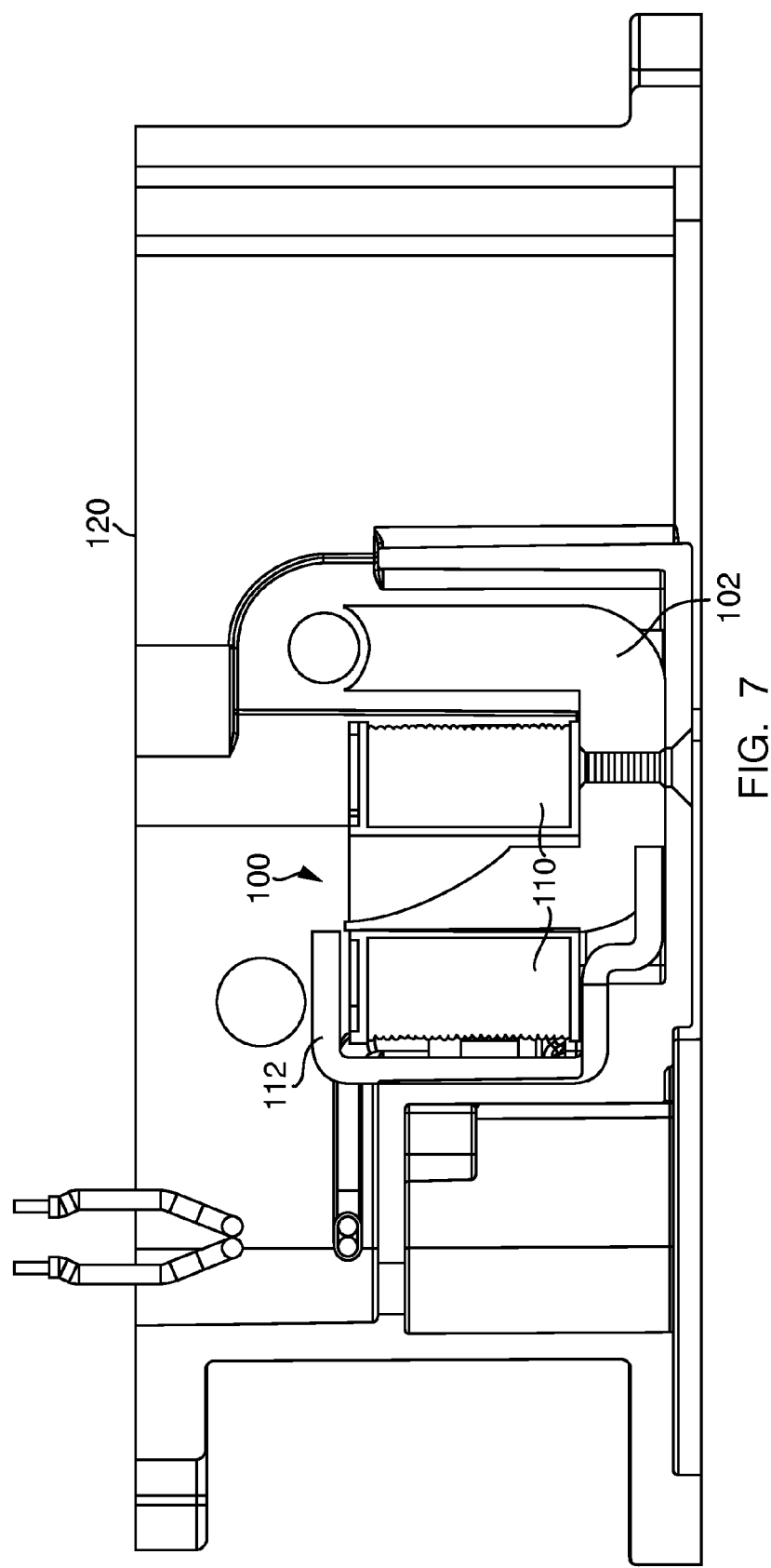

ELECTROMAGNETIC ACTUATOR HAVING ENHANCED MAGNETIC STRUCTURES

CROSS-REFERENCE TO RELATED APPLICATIONS

This application is entitled to the benefit of and incorporates by reference essential subject matter disclosed in U.S. Provisional patent application No. 61/771,123 filed on Mar. 1, 2013

FIELD OF THE INVENTION

The present invention relates to electromagnetic actuators and, in particular, to an electromagnetic actuator having enhanced magnetic structures for channeling magnetic flux.

BACKGROUND OF THE INVENTION

An actuator is a device utilized to move or control a mechanism of system. Electromagnetic actuators are operated by a source of energy, namely and electric current, and convert that energy into motion. FIGS. 1 and 2 illustrate known three-prong and single prong actuators 10, 20, respectively. As shown therein, the actuators 10, 20 generally include a stator 22 and an armature 24 configured for rotational or pivoting movement relative to the stator 22. The armature 24 and stator 22 are typically manufactured from high permeability material, such as steel. The armature 24 typically includes one or more prongs 26. For example, the armature 24 in FIG. 1 has three prongs 26 while the armature in FIG. 2 has a single prong 26. The stator 22 may include two or more legs, around one of which a coil of wire 28 is fitted. In operation, current is introduced into the coil 28 to produce an electromagnetic force which is used to attract the hinged armature 24 to the stator 22 to rotate the armature 24.

As will be readily appreciated, when the coil 28 is energized, a magnetic field is created 360 degrees around the coil. The magnetic flux of the magnetic field circles through the metal armature 24 (and through the tips of the prongs 26) and stator 22, causing a magnetic attraction between the armature 24 and stator 22 to rotate the armature 24. With the three-prong actuator 10 of FIG. 1, substantially all of the magnetic flux generated by energizing the coil 28 is captured by the by the armature 24 and stator 22, and directed therethrough to generate a closing force to rotate the armature 24 towards the stator 22. Single prong actuators, however, like the actuator 20 shown in FIG. 2, are unable to capture all of the generated magnetic flux. In particular, as shown therein, magnetic field lines 30 emanating from one side of the coil 28, which wrap around to the other side of the coil 28 are lost, i.e., they are not collected by the armature 24 nor stator 22 and, therefore, do not contributed to the production of the rotating force or torque.

As will be readily appreciated, three-prong actuator designs have armatures 24 and stators 22 that combine to cover about 75% of the circumference of the coil 28. In contrast, single and two-prong actuator designs have armatures 24 and stators 22 that combine to cover only about 35% of the circumference of the coil 28, with the single prong designs having a less efficient magnetic path, as illustrated in FIG. 2. As a result, three-prong actuators typically have a much stronger closing force than their two-prong or single-prong counterparts.

In certain applications, where size is of concern, single prong actuator designs must sometimes be utilized. The work output (i.e., generated torque or closing force) of such single-prong actuators suffers, however, due to the large amount of low-permeability air surrounding almost 75% of the coil circumference.

Accordingly, there is a need for an actuator having an enhanced magnetic structure that provides increased work output or closing force compared to known actuators of similar size and type.

SUMMARY OF THE INVENTION

It is an object of the present invention to provide an actuator.

It is another object of the present invention to provide an electromagnetic actuator having enhanced magnetic structures.

It is another object of the present invention to provide an electromagnetic actuator that provides increased work output or closing force compared to known actuators of similar size and type.

These and other objects, features, and advantages of the present invention will become apparent in light of the detailed description of the best mode embodiment thereof, as illustrated in the accompanying drawings.

BRIEF DESCRIPTION OF THE DRAWINGS

The present invention will be better understood from reading the following description of non-limiting embodiments, with reference to the attached drawings, wherein below:

FIG. 6 is a cross-sectional, perspective view of the actuator of FIG. 3 installed in a housing.

FIG. 7 is a side elevational view of the actuator of FIG. 3 installed in a housing.

Other features and advantages of the present disclosure will become apparent from the following detailed description, taken in conjunction with the accompanying drawings, which illustrate, by way of example, the principals of the invention.

DETAILED DESCRIPTION OF THE PREFERRED EMBODIMENTS

Figure 1:
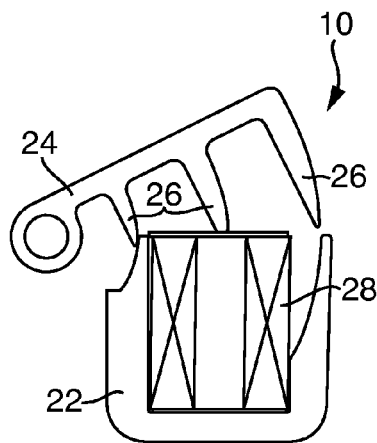
FIG. 1 is a side-elevational view of a prior art three-prong actuator.
Figure 2:
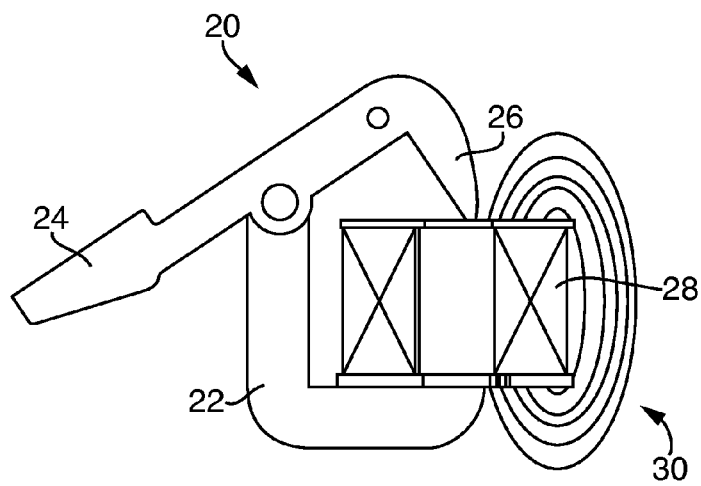
FIG. 2 is a side-elevational view of a prior art single-prong actuator.
Figure 3:
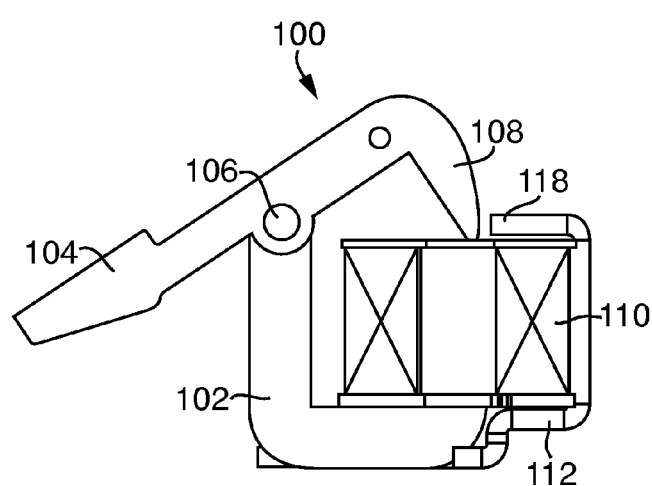
FIG. 3 is a side-elevational view of an actuator having enhanced magnetic structure according to an embodiment of the present invention.

Referring to FIG. 3, an electromagnetic actuator having enhanced magnetic structures 100 according to an embodiment of the present invention is shown. The actuator includes a stator 102 and an armature 104. In an embodiment, the actuator 100 may include a spring (not shown) for biasing the armature 104 to its open position. In an embodiment, the armature 104 and stator 102 are manufactured from a high permeability material, such as steel. The armature includes one or more prongs 108. The stator 102 may include two or more legs, around one of which a coil of wire 110 is fitted.

Figure 4:
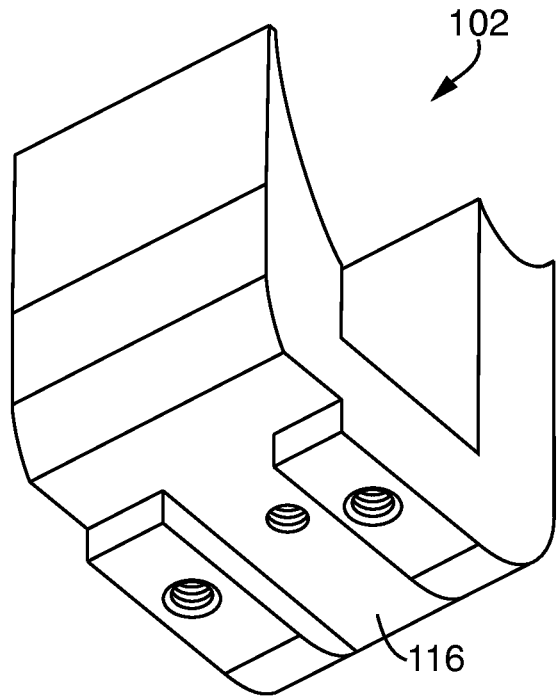
FIG. 4 is a perspective view of a stator of the actuator of FIG. 3.
Figure 5:
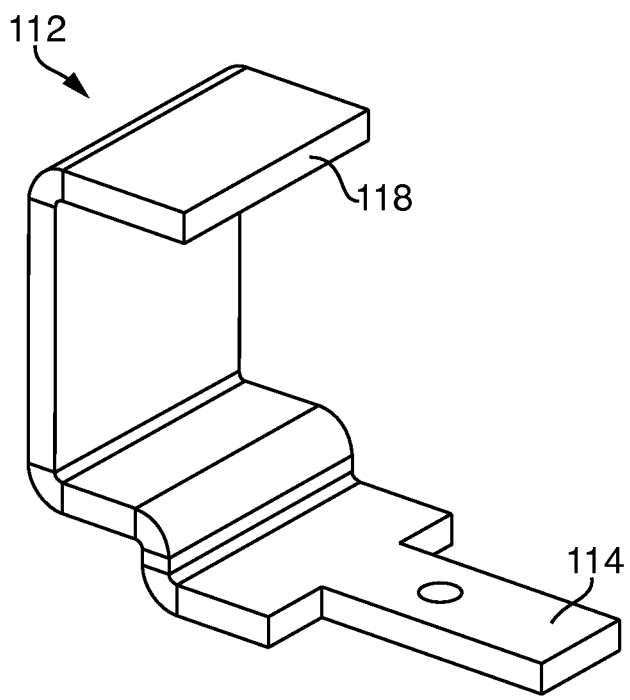
FIG. 5 is a perspective view of a flux gatherer of the actuator of FIG. 3.

As further shown therein, the actuator 100 includes a flux gatherer 112 extending from the stator 102 and encompassing the open coil area of the actuator. Like the armature 104 and stator 102, the flux gatherer 112 may be manufactured from a high permeability material such as steel, although other high permeability magnetic materials known in the art may also be utilized without departing from the broader aspects of the present invention. With specific reference to FIG. 5, the flux gatherer 112 is generally U-shaped and includes an arm 114 configured to fit within a corresponding slot 116 on the bottom of the stator 102, as shown in FIG. 4. In an embodiment, the flux gatherer 112 is secured to the stator 102 using a bolt of a screw, although other fastening means known in the art may also be utilized. In an embodiment, the flux gatherer 112 is integrally formed with the stator 102.

As shown in FIG. 3, the flux gatherer 112 extends from the bottom of the stator 102 and wraps around and encompasses the exposed end of the coil 110 (i.e., the open coil area). The flux gatherer 112 is sized and shaped such that a distal end 118 of the flux gatherer 112 is in close association with the prong 108 of the armature 104. Importantly, the flux gatherer 112 therefore provides a static, high permeable medium around the open area of the coil 110 where the magnetic flux can travel through the medium through the armature 104 and back to the center of the coil 110 to the active moving magnetic armature 104.

The flux gatherer 112 creates an additional magnetic path that is utilized to channel stray magnetic fields that emanate away from the coil back into the magnetic path used to develop a rotating force in the actuator. In particular, when the coil 110 is energized with DC current, the magnetic flux is generated along the axis of the coil 110 and emanates out of the coil 110 top in a 360 degree pattern, returning back to the coil 110 bottom from all directions.

With known actuators of this type, a portion of the flux is channeled through the stator and armature creating the desired actuator force. A percentage of the flux that is opposite the stator, however, returns to the coil through free air and does not travel through the stator or armature, resulting in lost energy.

The flux gatherer 112 of the actuator 100 of the present invention, however, channels this stray magnetic flux back to the stator 102 and armature 104 such that additional rotating force (i.e., magnetic attraction between the armature 104 and stator 102) is created. In an embodiment, the rotating force may be increase approximately 20% over existing actuators of similar type and size.

FIGS. 6 and 7 illustrate the actuator 100 of the present invention positioned within a housing 120.

While the flux gatherer 112 of the actuator 100 of the present invention is particularly applicable to single-prong actuators, such as that shown in FIG. 3, the flux gatherer 112 may also be utilized with two prong moving armature actuators currently used in the industry.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. An electromagnetic actuator, comprising:
   a coil, said coil being selectively energizable by an electric current;
   an armature having a downwardly extending prong, said armature being movably disposed with respect to said coil such that when said coil is energized with said electric current, said armature moves in relation to said coil, said prong moves in relation to said coil and being disposed on a first side of said coil; and
   a flux gatherer disposed around a second side opposite to said first side of said coil, thereby channeling magnetic flux emanating from said coil back into said armature and said prong.

2. The electromagnetic actuator of claim 1, wherein:
   said flux gatherer further comprises a gatherer plate,
   a first leg attaching to one end of said gatherer plate, and
   a second leg attaching to the other end of said gatherer plate.

3. The electromagnetic actuator of claim 2, wherein:
   said electromagnetic actuator further comprising a stator.

4. The electromagnetic actuator of claim 3, wherein:
   wherein said armature is rotatably mounted on a first arm of said stator, and said first leg of said flux gatherer is movably mounted on a second arm of said stator.

5. The electromagnetic actuator of claim 3, wherein:
   said gatherer plate is disposed adjacent to said second side of said coil.

6. The electromagnetic actuator of claim 5, wherein:
   said coil is enclosed by said flux gatherer, said prong and said armature such that stray magnetic flux are channeled back to said stator and said armature.

7. The electromagnetic actuator of claim 3, wherein:
   said flux gather is integrally formed to said stator.

8. The electromagnetic actuator of claim 1, wherein:
   said flux gatherer comprises a high permeability material.

9. A method of manufacturing an electromagnetic actuator, comprising:
   selectively mounting a stator with a flux gather having a gatherer plate;
   rotatably mounting an armature having a downwardly extending prong to said stator;
   disposing an electrical energizable coil in said stator;
   wherein, when said coil is energized by an electric current, said armature moves in relation to said coil to a position where said prong moves in relation to said coil and is disposed next to a first side of said coil, and said flux gatherer is disposed to a second side opposite to side first surface of said coil.

10. The method of manufacturing an electromagnetic actuator of claim 9, wherein:
    when said prong is disposed next to said first side of said coil, said coil is enclosed within a chamber formed by said stator, said armature and said prong such that stray magnetic flux is channeled back to said stator and said armature.

11. The method of manufacturing an electromagnetic actuator of claim 10, wherein:
    when said coil is de-energized, said armature moves away from said position and said prong moves away from said first side of said coil.

* * * * *